Oct. 27, 1936.  R. S. PERRY  2,058,498
METHOD AND APPARATUS FOR MACHINING OF WORKPIECES
Filed May 31, 1934  4 Sheets-Sheet 1

INVENTOR
Raymond S. Perry
By Chindahl, Parker & Carbon
ATTORNEYS

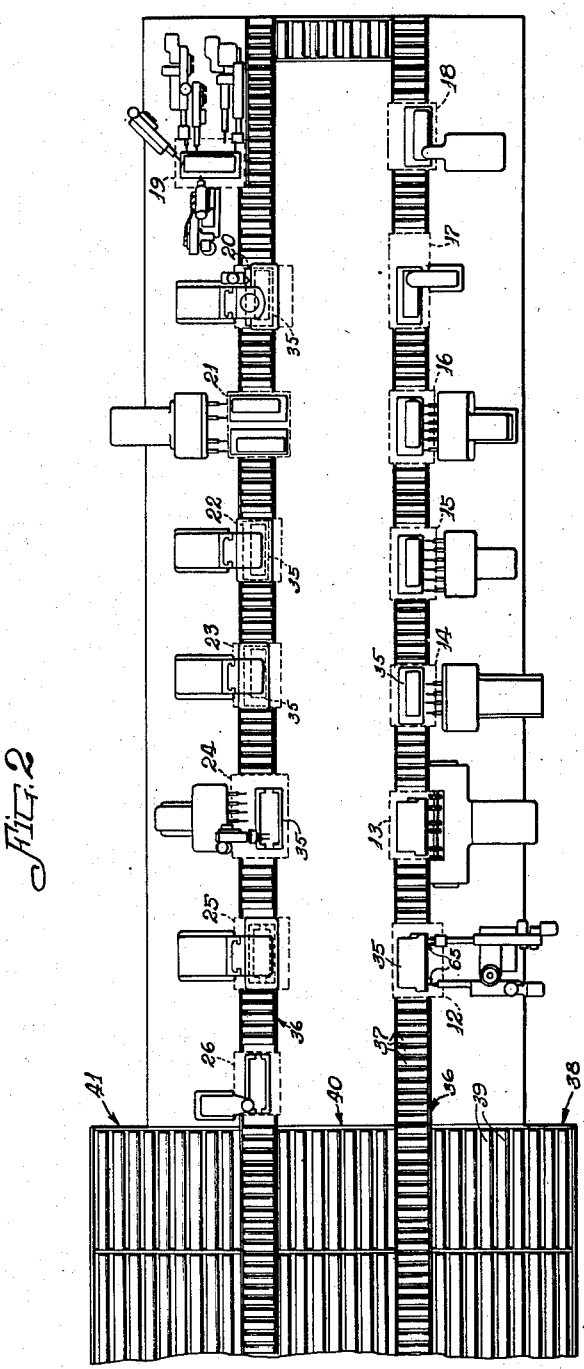

Oct. 27, 1936.   R. S. PERRY   2,058,498
METHOD AND APPARATUS FOR MACHINING OF WORKPIECES
Filed May 31, 1934   4 Sheets-Sheet 3
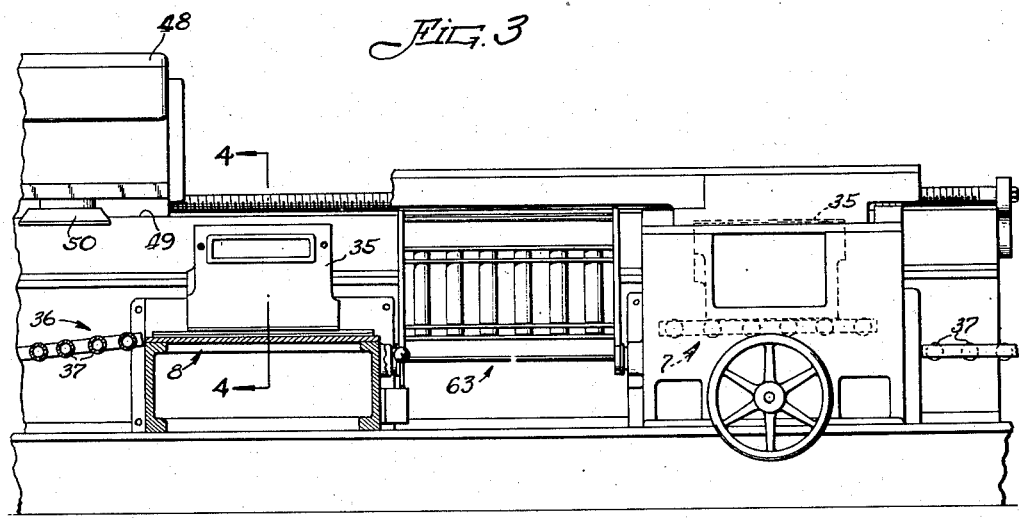
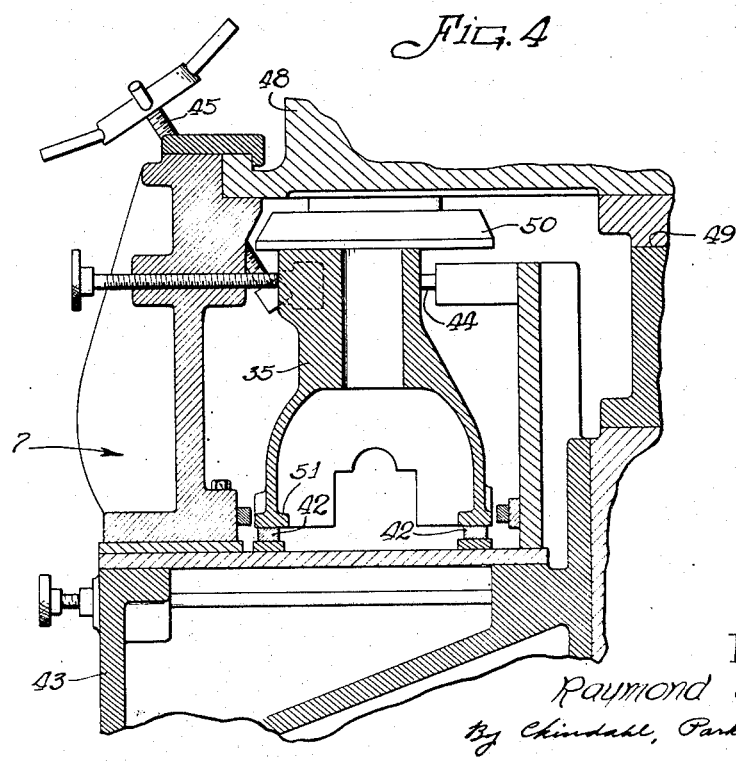
INVENTOR
Raymond S. Perry
By Chindahl, Parker & Carlson
ATTORNEYS Oct. 27, 1936.  R. S. PERRY  2,058,498
METHOD AND APPARATUS FOR MACHINING OF WORKPIECES
Filed May 31, 1934  4 Sheets-Sheet 4
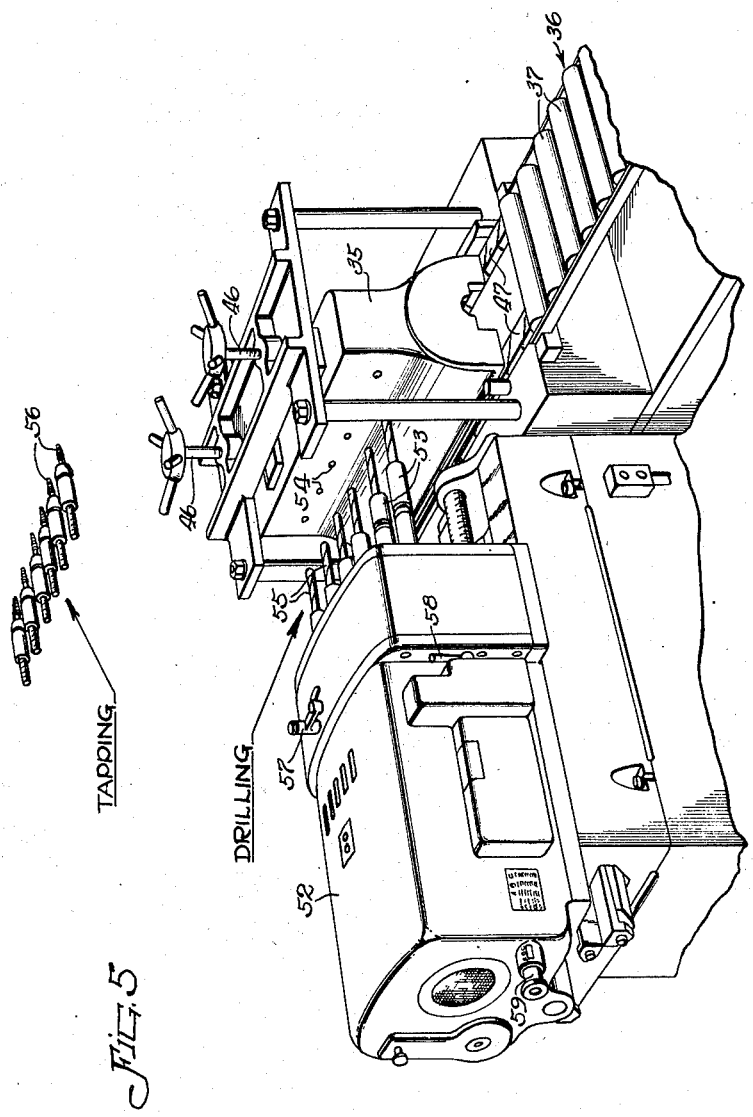
INVENTOR
Raymond S. Perry
By Chindahl, Parker & Carlson
ATTORNEYS Patented Oct. 27, 1936

2,058,498

UNITED STATES PATENT OFFICE 2,058,498

METHOD AND APPARATUS FOR MACHINING OF WORKPIECES

Raymond S. Perry, Rockford, Ill., assignor to The Ingersoll Milling Machine Company, Rockford, Ill., a corporation of Illinois Application May 31, 1934, Serial No. 728,393

11 Claims. (Cl. 29—33)

This invention relates to the machining of work pieces having a number of different parts on which a variety of different metal-removing processes are to be performed in order to condition the work piece for use.

The general object of the invention is to provide a new and improved method and apparatus by which work pieces of the above character may be machined with a minimum capital investment in machine tools, fixtures therefor, and equipment for handling the work pieces while at the same time maintaining a low unit labor cost.

Other objects and advantages will become apparent from the following detailed description taken in conjunction with the accompanying drawings in which:

Figures 1 and 2 together constitute a plan view of the apparatus for use in practicing the invention.

Fig. 3 is a front elevation partially in section of the machine for operating upon the work pieces at stations hereinafter referred to as 7 and 8.

Fig. 4 is a section taken along the line 4—4 of Fig. 3.

Fig. 5 is a fragmentary perspective view of a dual operation machine which operates on the work pieces at station 14.

Figure 1:
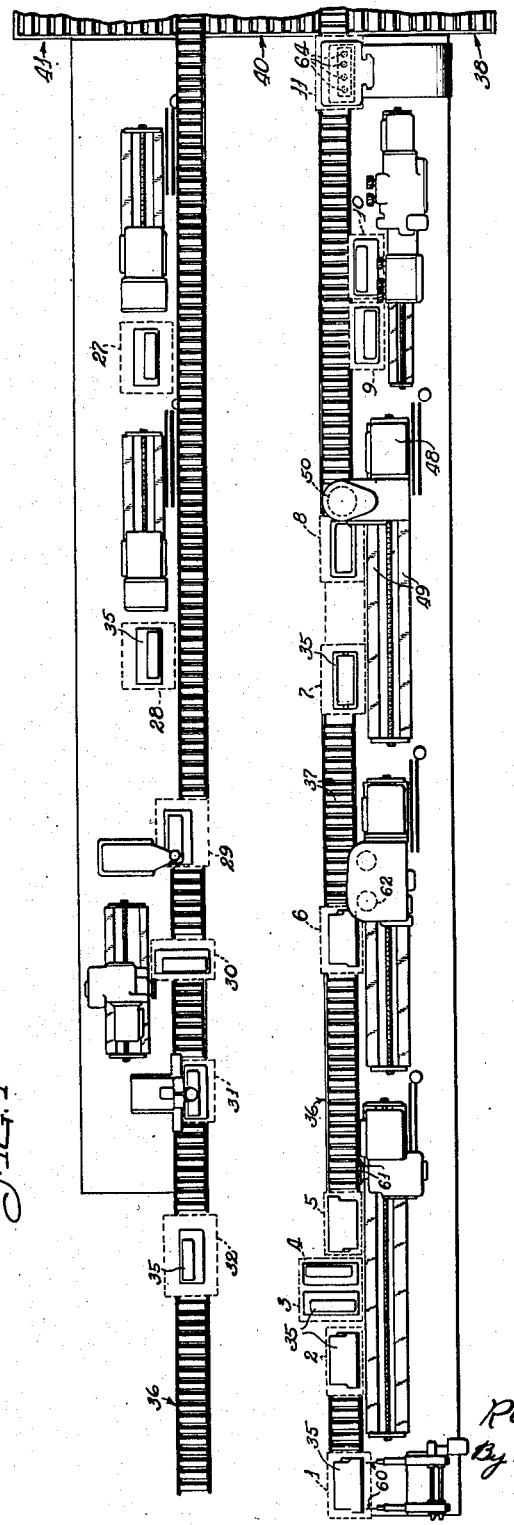

While I have illustrated in the drawings and will herein explain the invention as applied to the machining of the cast iron blocks 35 of internal combustion engines, it is to be understood that I do not intend thereby to limit the invention, but aim to cover all modifications falling within the spirit and scope of the invention as expressed in the appended claims.

Completion of a casting of the above character generally requires the performance of a number of surfacing operations such as rough and finish milling on several sides and drilling of the casting from different sides to form groups of spaced holes which are later tapped, reamed, counterbored, faced or otherwise finished. Advantage is taken of the fact that the same holes of a group which are drilled in one multiple spindle operation usually must be tapped or otherwise finished by tools located on the same centers as the tools by which the holes were formed.

Accordingly, the invention contemplates arranging in a continuous line a plurality of operating stations grouped according to the character of the operations to be performed and each having one or more tools to act upon the castings, moving the castings through the successive stations, temporarily securing the castings in fixed position while performing metal-removing operations thereon at the respective stations, withdrawing the castings successively from the line after they have passed through a group of milling and a group of drilling stations, then reintroducing the castings successively into the initial station of the second group for a second passage through the stations of this group while simultaneously withdrawing into storage the castings advancing through the stations of the first group, and performing tapping or other finishing operations on the castings during the second passage of the castings through the stations of the second group.

In the present instance, the different work stations, which are represented by dotted rectangles in Figs. 1 and 2 are spaced longitudinally of a conveyor 36 along which the castings may be maintained in a line while being advanced from station to station which, if desired, may be accomplished by sliding them manually over antifriction rollers 37 constituting the conveyor. The conveyor illustrated is of elongated U-shape with legs of substantially equal lengths spaced relatively close together so that one operative may conveniently attend to several stations located on opposite sides of the U. To afford ready access to the stations, the machines which operate upon the castings are disposed along the outer edges of the conveyor and, in the case of many of the stations, the tools are arranged to operate only on the top or outwardly facing surface of the casting and in a direction longitudinally of the conveyor.

Nearly all of the stations at which hole-forming and hole-finishing operations are performed are grouped together and form the closed end of the U, these being numbers 12 to 26 (Fig. 2). Preferably the remaining stations are divided into two groups numbered 1 to 11 and 27 to 32 and are respectively arranged in line with the two rows of stations of the group 12 to 26. Interposed between the last station of the first group 1 to 11 and the first station of the second group is a storage area 38 onto which castings from the first group of stations may be slid and temporarily stored while other castings are being advanced a second time through the stations of the second group. Herein, this storage area is disposed externally of the conveyor 36. The storage area may comprise closely spaced rollers 39 disposed at substantially the same level on the conveyor rollers 37 and preferably extended at right angles to the latter rollers so as to facilitate movement of the castings transversely of the conveyor. A storage mechanism 40 of similar construction is disposed between the opposite legs of the U-shaped conveyor adjacent the terminal stations 12 and 26 of the second group for receiving the castings after the first passage through the stations of the second group. A third storage area 41 is located externally of the conveyor 36 between the adjacent terminal stations of the second and third groups.

Each of the operating stations includes a rigid support onto which a casting may be moved conveniently from the conveyor rollers and to which the casting is secured rigidly and in an accurately defined position preparatory to operation of the cutting tool or tools thereon. For example, in the station 7, the casting rests in upright position upon rails 42 (Fig. 4) on a base 43 and is firmly held in place against a locating abutment 44 by a manually operable clamping screw 45. As shown in Fig. 5, the casting is similarly secured by clamps 46 upon rails 47 and against an abutment at the station 15. After release of the clamping screws, the casting may be moved onto the next section of the conveyor or directly into the next station as is done in some instances where one cutting tool operates on a succession of castings in different stations during one cutting stroke.

The machine shown in Figs. 3 and 4 is typical of those employed to perform the surfacing operations. This machine forms the subject matter of a copending application of Alexander Oberhoffken, Serial No. 728,709, filed June 2, 1934, and comprises generally a tool head 48 power-driven along ways 49 and carrying a milling cutter 50 operating in the first part of the active stroke to finish mill the top surface of a casting held in station 8 and in the latter part to finsh mill the bottom surface of the crank-case flange 51 on the casting held in station 7.

A typical one of the dual operation machines is illustrated in Fig. 5. As disclosed in Patent No. 2,040,872 of Alexander Oberhoffken, this machine comprises generally a slidable head 52 carrying power-driven spindles 53 spaced according to the holes 54 to be formed and finished and adapted to receive interchangeably chucks carrying drilling tools 55 or collets carrying taps 56 or other finishing tools. The spindles are motor-driven through speed-change gearing which, by shifting of a hand lever 57, may be conditioned for rotation of the spindles at a slow tapping speed or at a higher drilling speed. By shifting a lever 58, the rate of feed of the tool head may be changed to correspond to the character of the tool on the spindles. The tool head also embodies automatic cycle control mechanism which, by shifting a handle 59 into one or the other of two axial positions may be conditioned for the execution of an automatic drilling cycle of rapid approach, feed and rapid return motions of the tool head or a tapping cycle of rapid approach, feed, reverse feed, and rapid return motions. Thus, the machine may be conditioned quickly and conveniently for the performance of hole-forming or hole-finishing operations at points on the casting determined by the location of the spindles 53.

The blocks are introduced into the production line at station I where tools 60, in a machine of the character disclosed in a copending application of Marion L. Strawn, Serial No. 15,218, filed April 8, 1935, drill, ream, and counter-sink in the bottom of the block two dowel holes which are used as reference points for subsequent operations. A milling cutter 61 operates in a single active stroke to rough mill the top of a block fixed in station 5, mill the front end of the next block in station 4, rough mill the end and bottom of the next two blocks in stations 3 and 2. In station 6, the crank shaft bearing locks are milled by a cutter 62. From this station the block is advanced to station 7 where the bottom surface is finished in the final part of the active strokes of the cutter 50. Then the block is inverted in a rotatable conveyor section and slid into the station 8 where the top surface is finished in the initial movement of the milling cutter 50. Milling operations are performed at stations 9 and 10 while at station 11, the last of the first group, the holes for the cylinder sleeves are rough and finish bored and counter-bored by tools 64.

Assuming that the storage area 38 is empty and that the machines at the stations of the second group are conditioned to perform their first operations, the blocks leaving station 11 will be advanced along the conveyor directly to station 12 where tools 65 drill holes in the crankshaft bearings.

Multiple drilling operations are performed on the blocks in stations 14, 15, 16 and 20 to 26 inclusive by machines of the character shown in Fig. 5. No operations are performed at stations 13 and 17 during the first passage of the castings through the second group of stations. A variety of angularly spaced holes on different sides of the casting are drilled in station 19 and the distributor holes are bored at station 18. As the castings leave station 26, they are moved off from the conveyor 36 into the storage area 40.

When the desired number of castings have been drilled, the tools for operating on the castings at the stations 14, 15, 16 and 18 to 26 are removed and finishing tools substituted therefor and the machines are converted in the manner above described for the execution of their second operations in proper cycles and at the required speeds. Tapping tools are substituted at the stations 14, 15, 16, 20, 21, and 23 to 26 while reaming tools are used at the stations 18 and 22, and taps and spot-facing tools at station 19. At station 12, the mounting for the tools 65 is changed for a different angle of approach as is disclosed in the aforesaid application Serial No. 15,218. It will be observed that such conversion of the machines of the second group of stations may be effected successively so as to reduce to a minimum the time during which any one machine remains idle. Thus, the machines may be changed over in the order of operation on the castings so that the first machines of the group may be converted and ready to start the finishing operations while the subsequent machines are still performing the first operations on the last castings of the batch.

After adaptation of the machine at station 12 for the performance of its second operation, the drilled casting stored in the area 40 are advanced one by one into this station and successively through the subsequent stations 13 to 26 which also will have been adapted for their second operation by the time the first casting reaches any one of them. In the second passage of the castings through the stations of the second group, a different drilling operation is performed at station 12, the crankshaft bearings are milled at station 13, the cylinder sleeves are finished faced at station 17, reaming operations are performed at stations 18 and 22 to finish the holes formed in the previous passage of the castings through these stations and the holes drilled in the first operations at the remaining stations are tapped at these same stations.

As the castings leave the station 26, following their second passage through this station, they are moved to the station 27, the first of the third group where another metal removing operation is performed. The latter operation is relatively slower than the tapping operations so that it is necessary to store the accumulating castings in the area 41. The castings are completed by passage through all of the stations of the third group at some of which milling operations are performed and at others of which relatively slow hole forming operations, such for example as certain boring, drilling and reaming operations, are carried out.

While the machine at station 12 is being converted and during the second passage of the castings through the stations of the second group, the castings leaving station 11, the last one of the first group, are placed in the storage area 38. Here they remain until the stations of the second group have again been reconverted for the performance of their first operations upon a new batch of the partially finished castings.

The invention contemplates a predetermined correlation in the rates of production of the individual machines of each group and also between the machines of the different groups. Thus, the machines of each group are constructed to operate in approximately equal time intervals so that all of them may be operated substantially continuously without an objectionable accumulation of the castings on the conveyor between any two stations. Most of the relatively slow operations such as milling are performed by the machines of the first and third groups, and these operations are so timed that the castings are completed at a rate approximately one-half the rate of production in the machines of the second group. In this way, the output of the stations of the first and third groups over a prolonged operating period balances the output of the stations through which the castings must pass twice, the castings accumulating between the adjacent terminal stations of the successive groups of stations being stored conveniently in the areas 38, 40, and 41 or other suitable handling mechanism which may be provided. It will be observed that certain milling operations are performed in stations of the second group while some of the hole-forming operations are performed in the stations of the first and third groups, the operations being assigned to the different groups according to the time required for their execution rather than to the character of the process performed. Thus, by a proper grouping of the operations in the different groups and by storing the partially finished castings at the proper points, a continuous flow of the castings through all of the stations is, in effect, maintained and substantially all of the machines, at least those of more costly construction, operate substantially continuously at full capacity. In addition, the different stations are located conveniently so that one operator may attend to a relatively large number of stations. Accordingly, the capital invested in machines is reduced to a minimum while maintaining a low unit labor cost.

I claim as my invention:

1. The method of machining work pieces having a plurality of different operations to be performed thereon which comprises arranging in a continuous U-shaped row a plurality of operating stations each having one or more tools to act on the work pieces, moving the work pieces progressively in a continuous line in a U-shaped path to present them to the successive stations, temporarily securing the work pieces in fixed positions at the successive stations during operation of the tools thereon, withdrawing the work pieces successively from said U-path into a storage between the sides of the U-path after they have passed around the bend of the U-path and at a point intermediate the ends of said path and the remote curved portion thereof, then re-introducing the work pieces successively into the initial side of the U-path for a second passage around the curved part of the U-path while simultaneously withdrawing the work pieces advancing on the initial side of the U-path, and advancing the work pieces through the remaining stations after the second passage through the intermediate stations.

2. The method of machining work pieces having a plurality of different metal-removing operations to be performed thereon which comprises arranging in a continuous line a plurality of operating stations divided in three successive groups and each having one or more tools to act on the work pieces, moving the work pieces progressively through the successive stations of the successive groups, temporarily securing each work piece in fixed position during operation by the tools at the successive stations, withdrawing the work pieces successively from the line after they have passed through the stations of the first and second groups, then re-introducing the work pieces successively into one of the initial stations of said second group for a second passage in the same direction through the stations of this group while simultaneously withdrawing the work pieces advancing through the stations of the first group, and moving the work pieces through the stations of the third group after the second passage through the stations of the second group.

3. The method of machining work pieces on which a plurality of different operations are to be performed comprising arranging in a continuous line a plurality of operating stations comprising two successive groups in the second of which the stations are disposed in U-shape, moving the work pieces progressively through the successive stations of the groups, temporarily securing the work pieces in fixed positions while performing metal-removing operations thereon at the respective stations, withdrawing the work pieces successively from the line and temporarily storing them after they have passed through the stations of both groups, re-introducing the work pieces successively into one of the initial stations of said second group for a second passage through the stations of this group while simultaneously withdrawing the work pieces advancing through the stations of the first group, and performing different metal-removing operations on the work pieces in the stations of the second group during the second passage of the work pieces therethrough.

4. Apparatus for performing a multiplicity of metal-removing processes upon a work piece having, in combination, a U-shaped conveyor by which pieces of work may be advanced in a U-shape path, a line of machine tools spaced along the outer edge of said conveyor and each having one or more tools to act on the successive work pieces, a group of said machine tools around the bend of the U being readily changeable for the performance of either of two different metal-removing processes on the work pieces, storage mechanism between the legs of said conveyor for receiving the work pieces leaving the last station of said group and facilitating transfer across the loop for re-introduction into the initial station of said group for a second passage through the group of stations, said mechanism providing an additional area for storing work pieces from the initial stations during the second passage of work pieces through the stations of said group.

5. Apparatus for performing a multiplicity of metal-removing processes upon a work piece having, in combination, a line of machines each having one or more tools to act on the work pieces and divided into first and second groups, a plurality of machines of the second group being usable interchangeably for the performance of either of two different metal-removing processes on similar parts of the work pieces, conveyor mechanism by which a continuous flow of work pieces may be maintained through the successive machines of the groups, means for temporarily storing the work pieces after the initial operation thereon by the machines of both of said groups, and storage means for receiving the work pieces from the machines of the first group while the work pieces are being advanced a second time through the machines of the second group during which different operations are performed thereon.

6. Apparatus of the class described having, in combination, a line of machine tools divided into successive groups respectively adapted to perform surfacing, hole-forming or finishing and surfacing operations upon work pieces to be machined, the machine tools of the intermediate group being convertible selectively for the performance of hole-forming or hole-finishing operations whereby to permit groups of holes formed in the initial passage of the work pieces through the machine tools of said intermediate group to be finished by a second passage through the same machine tools, conveying means by which the work pieces may be advanced through the machine tools of the successive groups, storage mechanism for receiving the work pieces from the last machine tool of the intermediate group and transferring the pieces back to the initial machine tool of this group, mechanism for receiving work-pieces from the last machine tool of the first group during the second passage of the work pieces through the machine tools of the intermediate group, and mechanism for storing the work pieces accumulating between the last machine tool of said intermediate group and the initial machine tool of the third group.

7. Apparatus for performing a multiplicity of metal removing processes upon a work piece having, in combination, a continuous line of spaced machines arranged in two successive groups, the machines of one group being adapted for the performance of one set of metal removing operations, the machines of the other group being convertible interchangeably for the performance of either of two different sets of operations, and means by which work pieces may be conveyed once to the successive machines of said one group and twice to the successive machines of said other group.

8. Apparatus for performing a multiplicity of metal removing processes upon a work piece having, in combination, a continuous line of spaced machines arranged in two successive groups, the machines of one group being adapted for the performance of one set of metal removing operations, the machines of the other group being convertible interchangeably for the performance of either of two different sets of operations, means by which work pieces may be conveyed once to the successive machines of said one group, and twice to the successive machines of said other group, and storage means adapted to receive work pieces after one passage through said other group to await a second passage therethrough.

9. Apparatus for performing a multiplicity of metal-removing processes upon a work piece having, in combination, a continuous line of spaced machines arranged in two successive groups, each machine of the second group being usable interchangeably for the performance of hole-forming operations or hole-finishing operations on the same portions of a work piece and a plurality of the machines of the first group being adapted to perform surfacing operations, means by which work pieces may be conveyed to the successive machines of the groups, and means interposed between the adjacent terminal machines of the two groups for storing work pieces leaving the machines of the first group while the machines of the second group are finishing the holes previously formed in a batch of the work pieces.

10. For use with a plurality of metal removing stations arranged in a continuous line and divided into successive groups with the station of the second group adaptable for the performance of either of two different metal-removing operations, the method which comprises moving work pieces progressively through the successive stations of said groups, performing metal-removing operations thereon on the work pieces at the different stations, placing in storage between the terminal stations of said second group a plurality of work pieces which have passed through the stations of both groups, conditioning the stations of said second group for the performance of their other metal-removing operations, and reintroducing the stored work pieces successively into the initial station of said second group while simultaneously withdrawing into storage the work pieces advancing through the stations of said first group.

11. For use with a plurality of metal removing stations arranged in a continuous line and each adapted for the performance of a plurality of metal-removing operations upon a work piece, the method which comprises advancing a batch of work pieces in succession through the successive stations while performing one metal-removing operation upon each work piece at the successive stations, placing the successive work pieces leaving the final station into storage between the latter station and the initial station, conditioning the stations successively beginning with the initial one thereof for the performance of different metal-removing operations, and reintroducing the stored work pieces successively into the initial station for passage a second time through the stations during which different metal-removing operations are performed upon the work pieces at the respective stations.

RAYMOND S. PERRY.